May 17, 1927.
A. R. THOMSON
ANTISKIDDING DEVICE
Filed June 29, 1923
1,628,929
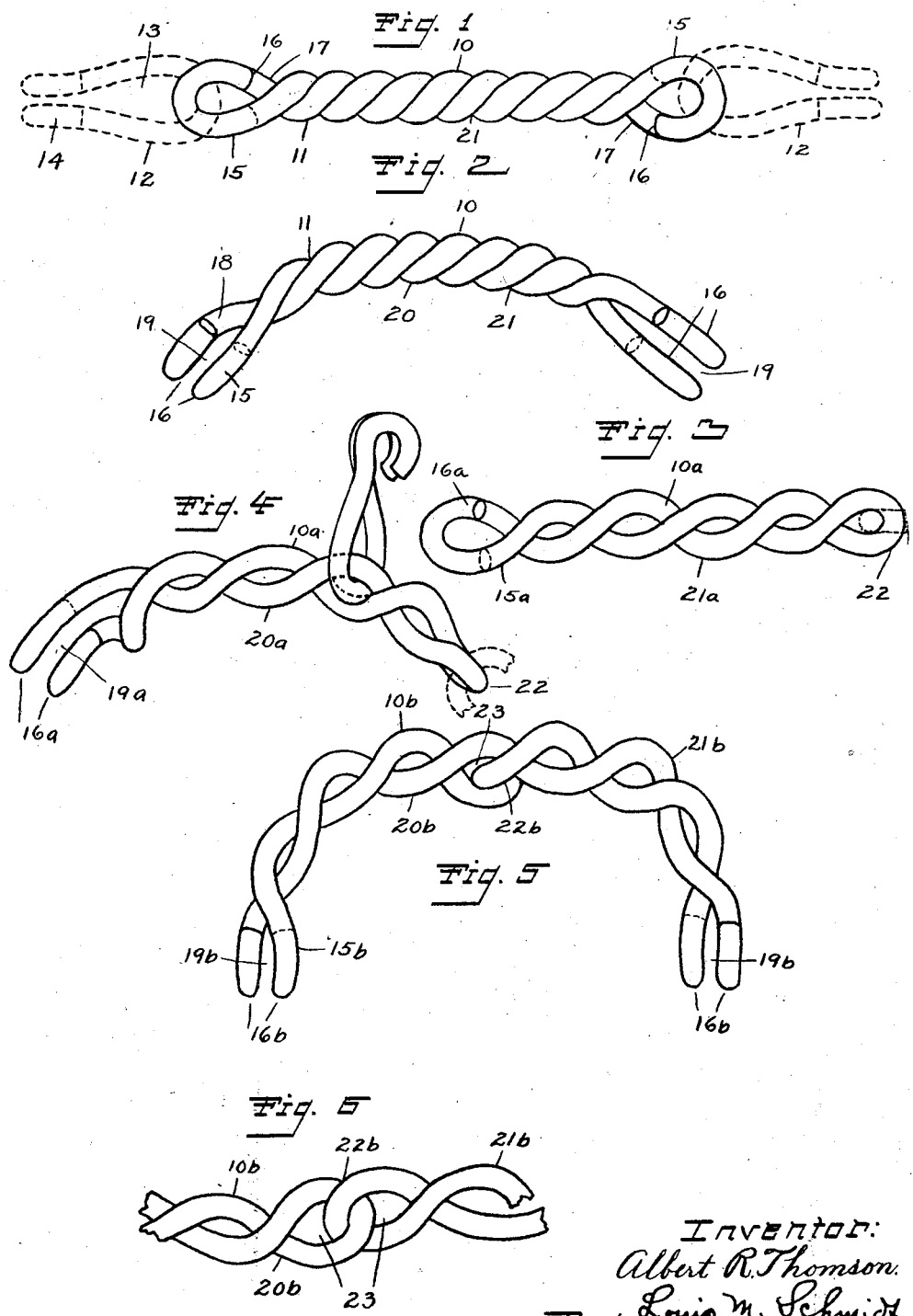

Patented May 17, 1927.

1,628,929

UNITED STATES PATENT OFFICE.

ALBERT R. THOMSON, OF DERBY, CONNECTICUT.

ANTISKIDDING DEVICE.

Application filed June 29, 1923. Serial No. 648,584.

My invention relates to improvements in anti-skidding devices for use with automobile wheels and of the form consisting of a pair of side chain structures for being positioned at the opposite sides of the wheel and a set of cross-chains that provide the tread portions and that inter-connect said side chain structures at spaced intervals, and the object of my improvement is simplicity and economy in construction and convenience and efficiency in use, confined substantially to said tread portions, the invention being related in some features to that which is shown and described in my copending application filed March 26, 1925, Serial No. 18,413.

In the accompanying drawing:—

Figure 1 is a plan view of a tread portion for use with a cross-chain structure and embodying my invention, the end hook members of said cross-chain structure being indicated by broken lines.

Figure 2 a side elevation of the same, involving as in Fig. 1 the detail of a pair of closely twisted wires that terminate in the form of hooks and with the opposed and adjacent hooks of the two wires spaced to provide a wire passage and positioned in opposite and non-parallel positions one to the other so as to operate each as a closure for the other.

Figure 3 is a plan view of a different form of tread portion, made of a single piece of wire doubled back upon itself and of open twisted form, so as to provide a passage between the wires for admitting the terminal hook of the cross-chain structure on one side to the loop at the doubled-back end.

Figure 4 is a side elevation of the same.

Figure 5 is a side elevation of a tread portion of a still different form, involving essentially a combination of the two part tread member construction shown and described in the patent granted to Napoleon Rinfrett, March 6, 1917, No. 1,217,999, and the open twisted form of construction or open-work construction of the tread portion shown in Figs. 3 and 4.

Figure 6 is a plan view of part of the same.

The particular embodiment of my invention as shown in Figs. 1 and 2 comprises an improved form of construction for the tread portion 10 of a cross-chain structure, designated as a whole by the character 11, and which latter is made complete by connecting to the ends of the tread portion 10 the terminal hooks 12 that in position for use are secured to the side chain portions of the structure of the anti-skidding device.

The terminal hooks 12 comprise in the common form an inwardly directed loop 13 that is formed by a return bend of a piece of wire. Outwardly from the loop 13 the ends of the wire are bent to form individual and cooperating hooks 14 that receive and engage with opposed links or corresponding or equivalent parts of the structure of the side chain. The individual hooks 14 are substantially closed so as to prevent accidental separation from the side chain structures.

My improved tread portions are all adapted to be connected to the terminal loops 13 without disturbing the feature of the substantially permanent connection of the terminal hooks 14 with the side chain structures.

To ensure an operatively permanent connection for the tread portion 10 the end portions 15 thereof are formed of two opposed and adjacent hooks 16 that are arranged oppositely disposed so that the body or shank portion 17 of one hook serves as a closure for the open portion or mouth 18 of the other.

Also, the opposed individual hooks 16 are positioned in laterally spaced relation so as to provide a wire space or passage 19 for admitting the wire of the closed loop 13 of the terminal hook 12.

The structure of the end hooks 15 of the tread portion 10 is essentially fixed and permanent by reason of the fact that the material used for making the tread portion 10 is steel wire and hardened in a proper manner, so as to be adapted to resist any tendency under conditions of use to distortion or change in structure.

As the material of the tread portion 10 is set by hardening, as mentioned, I provide a curved or arched form for the body portion 20, as shown, previous to the hardening, being of suitable form for passing over the curved structure of the tire on the automobile wheel.

The tread portion 10 is formed of two similar strands 21 of wire that are placed side-by-side and twisted along the middle to form the body portion 20. The ends of the wire strands 21 are bent to form the individual hooks 16 and the latter are positioned, as described, to form the double hook structure 15 with the circuitous passage for the terminal loops 13.

The tread portion 10 replaces a series of chain links that are commonly used to interconnect the terminal hooks 12.

The tread portion 10$^a$ shown in Figs. 3 and 4 is made of a single strand 21$^a$ of wire that is bent back upon itself at the middle 22 to form a closed loop. The ends 16$^a$ are formed into individual hooks that are constructed and arranged so as to compose a double hook structure 15$^a$ that is substantially like the hook structure 15 already described.

In the case of the body portion 20$^a$, this is formed of the two arms of the loop 22 that are positioned side-by-side and twisted, but in a different manner than in the case of the two strands 21 mentioned in connection with the tread portion 10 in that the opposed and adjacent portions of the strand 21$^a$ are separated by a wire receiving space that may be briefly described as being essentially a continuation of the separating space 19$^a$ between the opposed and adjacent individual hooks 16$^a$.

The tread portion 10$^a$ provides a gripping structure or a gripper structure, for facilitating the holding effect on the roadway under conditions of use and preventing skidding.

In Figs. 3 and 4 a part of the terminal hook structure 12 that connects with the closed loop 22 is shown by broken lines and in Fig. 4 said hoop structure 12 is shown in full lines in an intermediate position indicating the manner in which the same is slipped along the passage 19$^a$ intermediate the opposed and adjacent portions of the strand 21$^a$.

The Rinfrett patent shows a tread member composed of two half parts that have at the middle of the tread member structure inter-engaged loops substantially after the manner of the loops 22$^b$ shown in the tread portion 10$^b$ that is shown in Figs. 5 and 6.

Said tread portion 10$^b$ is composed of two similar half parts that comprise each a structure that is formed of a single strand 21$^b$ that is made substantially after the manner of the tread portion 10$^a$ except that it is shorter, so that the two half parts will combine to provide a total or overall length that will be substantially equal to that of the tread portions 10 and 10$^a$.

Thus the loop 22$^b$ is formed by a return bend of the strand 21$^b$, the body portion 20$^b$ is formed by the opposed and adjacent twisted portions of the strand 21$^b$ and the ends of said strand 21$^b$ are shaped to provide the individual hooks 16$^b$ the latter cooperating to form the double-hook 15$^b$.

Also, the individual hooks 16$^b$ are separated by the wire receiving space 19$^b$, said space 19$^b$ being continued along the body portion 20$^b$ so as to provide communication with the open space 23 of the end loop 22$^b$. The spaces 19$^b$ facilitate inter-connecting the two individual sections or half parts that compose the tread portion 10$^b$, and also the provision of the gripping effect of the openwork form for the body portions under conditions of use.

No special tools are required for assembling my improved tread portions with the terminal hooks as the end hooks are connected therewith readily by a simple manipulation of the parts to effect the proper engagement thereof.

The end portions 15, 15$^a$, and 15$^b$ as shown and described are composed of a pair of mating hooks 16, 16$^a$, and 16$^b$.

Some form of single hook structure may in some cases be used, though preferably a form should be used that provides a circuitous passage for connecting and disconnecting the cooperating part.

A form of hook structure that is adapted for such use is the one that is shown and described in the patent that was issued to myself under date of November 30, 1920, No. 1,360,600, which provides a single strand structure for the hook proper.

In the form shown in Fig. 4 the individual hooks 16$^a$ are shown separated by a space 19$^a$ and, similarly, in the form shown in Fig. 5 the hooks 16$^b$ are separated by the space 19$^b$. Such spacing represents the normal conditions, due to the set usually obtained for the parts in the hardening, the structures as a whole being each a spring structure. In some cases the structures may be set with the individual hooks set close together. In any case the relative positions of the hooks 16$^a$ or 16$^b$ may be readily changed to facilitate making connection with some other part by means of pressure applied to the individual strands, generally by simply squeezing the body portion 20$^a$ or 20$^b$. Also, changes in the details as to the relative positions of the individual hooks may be made to facilitate manipulation of the strands and hooks to effect special results.

I claim as my invention:—

1. A tread element for use in an anti-skidding device for bringing the space between the opposed loops on terminal hooks that are connected individually to the two side frame structures of said anti-skidding device and having means for being connected to said loops, said tread element being composed of wire and hardened, and comprising a body portion that is formed of opposed and adjacent portions of the wire and twisted, said means being at the ends of said tread element, and one of said means being of double-hook form, composed of a pair of individual hooks that have the shank portions merged with the parts of the wire that compose said body portion.

2. A tread element for use in an anti-skidding device comprising a body portion of appreciable length, said body portion being composed of two portions of wire that are positioned side by side and twisted, and said portions being positioned relatively one to the other so that opposed or adjacent portions of the two portions are out of contact or spaced one from the other.

3. A tread element as described in claim 2, the two ends of the portions at one end of the tread element being connected by a closed loop, and the two ends at the other end of the tread element being constructed and arranged to provide a hook structure, whereby the tread element is adapted to be made of a single piece of wire with a return bend serving to provide the closed loop.

4. A tread element for an anti-skidding device formed of wire and hardened and comprising a body portion and end portions at the ends of said body portion for cooperating with terminal hooks, and said body portion being composed of similar parts of wire that are opposed and adjacent and also twisted and that individually extend from end to end of said body portion.

5. An active tread member for an anti-skidding device made of a single piece of wire that is bent adjacent the middle to provide an open loop and a pair of strands connected to the arms of said loop, the free ends of said strands being swaged to provide a hook structure, the said strands being positioned side by side and twisted, and said strands being normally separated one from the other by an open space.

6. An active tread member for use in an anti-skidding device comprising a body portion of appreciable length, said body portion being composed of two portions of wire that are positioned side by side, and said portions being positioned relatively one to the other so that opposed or adjacent parts of the two portions are out of contact or spaced one from the other.

ALBERT R. THOMSON.